(12) United States Patent
Tahara

(10) Patent No.: US 11,698,333 B2
(45) Date of Patent: Jul. 11, 2023

(54) SAMPLE LIQUID-SENDING APPARATUS, FLOW CYTOMETER, AND SAMPLE LIQUID-SENDING METHOD

(71) Applicant: SONY CORPORATION, Tokyo (JP)

(72) Inventor: Katsutoshi Tahara, Tokyo (JP)

(73) Assignee: SONY CORPORATION, Tokyo (JP)

( * ) Notice: Subject to any disclaimer, the term of this patent is extended or adjusted under 35 U.S.C. 154(b) by 724 days.

(21) Appl. No.: 16/621,821

(22) PCT Filed: Apr. 3, 2018

(86) PCT No.: PCT/JP2018/014244
§ 371 (c)(1),
(2) Date: Dec. 12, 2019

(87) PCT Pub. No.: WO2018/235383
PCT Pub. Date: Dec. 27, 2018

(65) Prior Publication Data
US 2020/0124518 A1    Apr. 23, 2020

(30) Foreign Application Priority Data

Jun. 21, 2017 (JP) ................................. 2017-121121

(51) Int. Cl.
*G01N 15/14* (2006.01)
*G01N 1/10* (2006.01)
(Continued)

(52) U.S. Cl.
CPC ........... *G01N 15/1404* (2013.01); *G01N 1/10* (2013.01); *G01N 2001/1445* (2013.01); *G01N 2001/2071* (2013.01)

(58) Field of Classification Search
None
See application file for complete search history.

(56) References Cited

U.S. PATENT DOCUMENTS 4,864,856 A * 9/1989 Ichikawa ............ G01F 23/2967
73/864.34
6,203,759 B1 * 3/2001 Pelc .................... G01N 35/1065
73/863.02
(Continued)

FOREIGN PATENT DOCUMENTS

JP    57-057326 A     4/1982
JP    57-057326 Y2    12/1982
(Continued)

OTHER PUBLICATIONS

International Search Report and Written Opinion of PCT Application No. PCT/JP2018/014244, dated Jul. 10, 2018, 11 pages of ISRWO.

*Primary Examiner* — Brian R Gordon
(74) *Attorney, Agent, or Firm* — Chip Law Group

(57) ABSTRACT

[Solving Means] A sample liquid-sending apparatus includes a placement portion, a suction mechanism, and a vibrator. A sample container is placed in the placement portion, the sample container containing a suspension of a sample. The suction mechanism includes a nozzle configured to be inserted into the sample container placed in the placement portion, and suctions the sample through the nozzle. The vibrator vibrates the nozzle.

11 Claims, 11 Drawing Sheets

(51) Int. Cl.
    *G01N 1/14*      (2006.01)
    *G01N 1/20*      (2006.01)

(56) References Cited

U.S. PATENT DOCUMENTS

| | | | | |
|---|---|---|---|---|
| 6,232,129 | B1* | 5/2001 | Wiktor | B01L 3/0268 |
| | | | | 422/417 |
| 6,521,187 | B1* | 2/2003 | Papen | G01N 35/1065 |
| | | | | 73/863.02 |
| 6,537,817 | B1* | 3/2003 | Papen | B03C 1/288 |
| | | | | 134/8 |
| 2002/0106308 | A1* | 8/2002 | Zweifel | B01L 3/0262 |
| | | | | 422/67 |
| 2003/0049863 | A1* | 3/2003 | Woodward | B01L 3/0262 |
| | | | | 422/66 |
| 2004/0071601 | A1* | 4/2004 | Larson | B01L 3/0268 |
| | | | | 422/502 |
| 2015/0266026 | A1* | 9/2015 | Katsumoto | B01F 25/4521 |
| | | | | 422/526 |
| 2018/0345272 | A1* | 12/2018 | Kishimoto | B01L 3/0293 |
| 2020/0018775 | A1* | 1/2020 | Fujii | B01L 7/00 |
| 2020/0124518 | A1* | 4/2020 | Tahara | G01N 1/10 |
| 2020/0139318 | A1* | 5/2020 | Moskalev | B01L 3/021 |
| 2020/0164358 | A1* | 5/2020 | Smith | B01L 3/0268 |
| 2022/0113331 | A1* | 4/2022 | Nonaka | B01L 13/02 |

FOREIGN PATENT DOCUMENTS

| | | |
|---|---|---|
| JP | 05-001983 A | 1/1993 |
| JP | 07-239336 A | 9/1995 |
| JP | 2016-153805 A | 8/2016 |

* cited by examiner

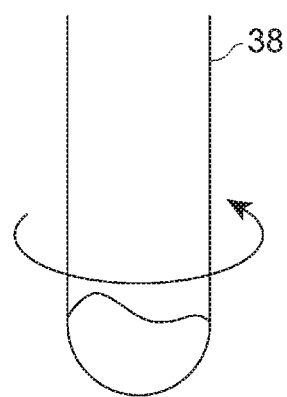
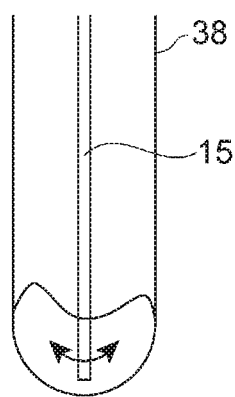
FIG. 4A
FIG. 4B

SAMPLE LIQUID-SENDING APPARATUS, FLOW CYTOMETER, AND SAMPLE LIQUID-SENDING METHOD

CROSS REFERENCE TO RELATED APPLICATIONS

This application is a U.S. National Phase of International Patent Application No. PCT/JP2018/014244 filed on Apr. 3, 2018, which claims priority benefit of Japanese Patent Application No. JP 2017-121121 filed in the Japan Patent Office on Jun. 21, 2017. Each of the above-referenced applications is hereby incorporated herein by reference in its entirety.

TECHNICAL FIELD

The present technology relates to a flow cytometer, a sample liquid-sending device used in the flow cytometer, and a sample liquid-sending method.

BACKGROUND ART

A flow cytometer flows a sample suspended in liquid through a tube using a sheath liquid, acquires data of scattered light and fluorescence obtained by a laser irradiator provided midway in the flow, and analyzes the data. For example, Patent Literature 1 discloses a sample feeding apparatus in a flow cytometer, the sample feeding apparatus including a stirring unit for performing stirring in a sample tube, and a nozzle that draws a sample in the sample tube by suction. The performing stirring in the sample tube using the stirring unit results in the nozzle inserted into the sample tube serving as a stirring rod that moves relative to the sample tube (for example, refer to paragraphs [0014] and [0049] of the specification, and FIG. 1). Performing stirring in a sample tube results in dispersing, in liquid, a sample accumulated in the bottom, and results in delivering the sample efficiently.

CITATION LIST

Patent Literature

Patent Literature 1: Japanese Patent Application Laid-open No. 2016-153805

DISCLOSURE OF INVENTION

Technical Problem

In the apparatus disclosed in Patent Literature 1, there is a need to perform stirring in the entirety of the sample tube in the stirring unit, and thus there is a need to provide a large-scale drive mechanism in order to performing such stirring. This results in an increase in costs.

An object of the present disclosure is to provide a sample liquid-sending apparatus that makes it possible to make a stirring mechanism smaller to achieve a reduction in costs, a flow cytometer that includes the sample liquid-sending apparatus, and a sample liquid-sending method.

Solution to Problem

In order to achieve the object described above, a sample liquid-sending apparatus according to an embodiment includes a placement portion, a suction mechanism, and a vibrator.

A sample container is placed in the placement portion, the sample container containing a suspension of a sample.

The suction mechanism includes a nozzle configured to be inserted into the sample container placed in the placement portion, and suctions the sample through the nozzle.

The vibrator vibrates the nozzle.

Since the vibrator that vibrates the nozzle is provided, it is possible to make the sample liquid-sending apparatus smaller and to reduce costs, compared to the case of providing a large-scale stirring unit for performing stirring in a sample tube.

The sample liquid-sending apparatus may further include a nozzle support that supports the nozzle. The vibrator may be provided to the nozzle support.

The vibrator may be provided to the nozzle. This makes it possible to stir the suspension of the sample efficiently.

The sample liquid-sending apparatus may further include a controller that is configured to control at least one of a strength of a vibration caused by the vibrator or a length of time of the vibration. This makes it possible to optimize a vibration state of the vibrator.

The controller may be configured to cause the vibrator to vibrate, and then to cause the suction mechanism to start an operation of suctioning the sample.

The controller may be configured to cause the vibrator to vibrate, to stop the vibrator from vibrating, and then to cause the suction mechanism to start the operation of suctioning the sample. It becomes possible to detect a sample efficiently by the vibrator vibrating before the operation of suctioning the sample is started, as described above.

The controller may cause the vibrator to vibrate continuously or intermittently.

The sample liquid-sending apparatus may further include a detector that detects the sample suctioned by the suction mechanism. The controller may be configured to control, according to a threshold, at least one of the strength of the vibration or the length of time of the vibration, the threshold being set with respect to the number of the samples detected by the detector. Such an automatic control makes it possible to perform a sample measurement efficiently and properly.

The sample liquid-sending apparatus may further include a cleaning unit that cleans the nozzle. The vibrator may be provided to the cleaning unit. Alternatively, when a plurality of the vibrators is provided, at least two of the plurality of the vibrators may be respectively provided to the nozzle support and the cleaning unit.

Alternatively, at least two of the plurality of the vibrators may be respectively provided to the nozzle and the nozzle support.

A flow cytometer according to an embodiment includes the sample liquid-sending apparatus, a detector, and an analyzer.

The detector detects the sample suctioned by the suction mechanism.

The analyzer analyzes characteristics of the detected sample.

A sample liquid-sending method according to an embodiment includes inserting a nozzle into a sample container containing a suspension of a sample, the nozzle being included in a suction mechanism, the sample container being placed in a placement portion.

The nozzle is vibrated.

The sample is suctioned through the nozzle using the suction mechanism.

Advantageous Effects of Invention

As described above, the present technology makes it possible to make a stirring mechanism smaller to achieve a reduction in costs.

Note that the effect described here is not necessarily limitative and may be any effect described in the present disclosure.

BRIEF DESCRIPTION OF DRAWINGS

FIG. 4A illustrates performing stirring in a sample tube by a stirring method used in the past, the method moving an entire sample container integrally.

FIG. 4B illustrates a nozzle being vibrated by the vibrator.

MODE(S) FOR CARRYING OUT THE INVENTION

Embodiments according to the present technology will now be described below with reference to the drawings.

1. First Embodiment 1.1) Configuration of Sample Liquid-Sending Apparatus

Figure 1:
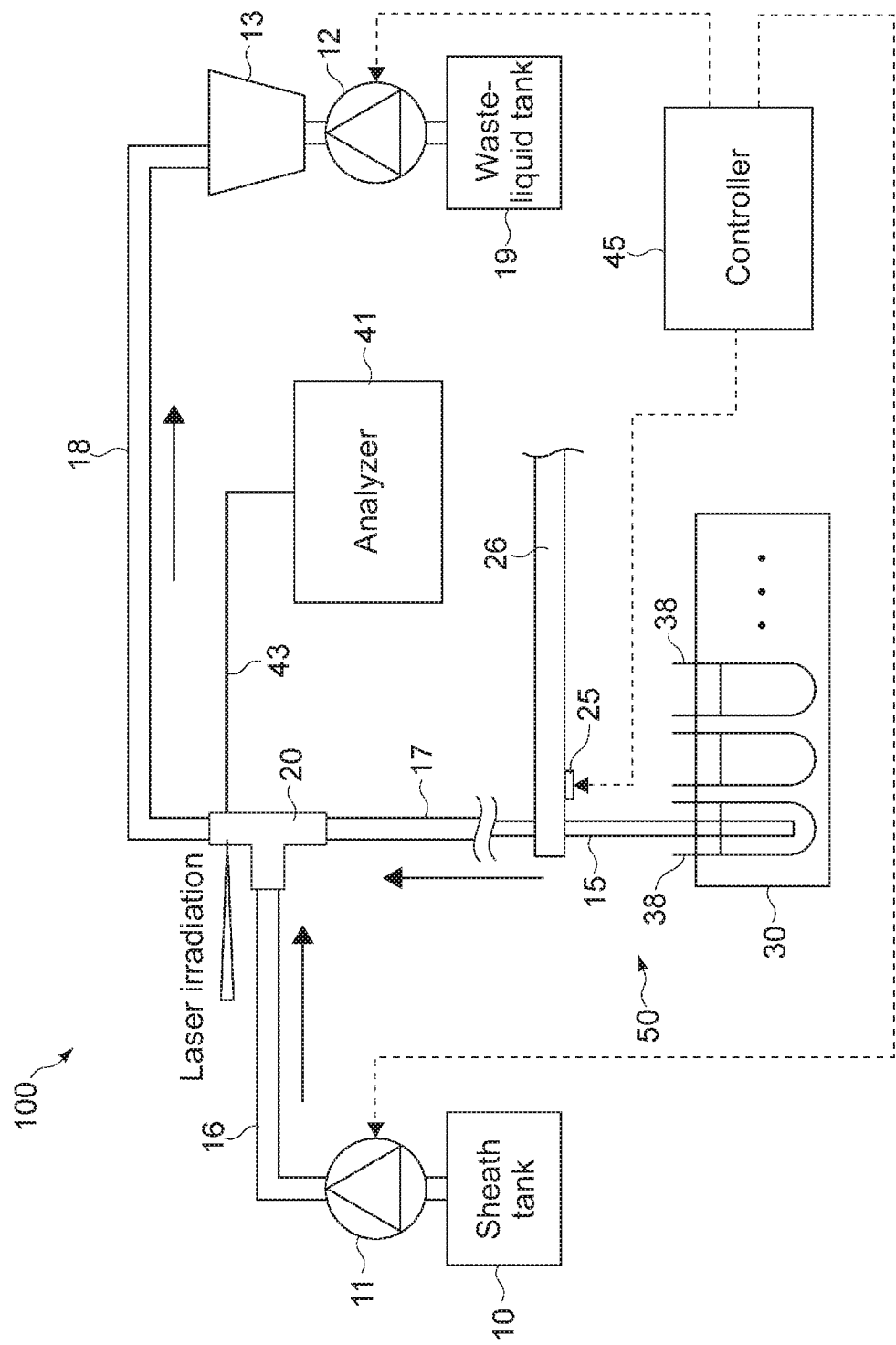
FIG. 1 primarily illustrates a sample liquid-sending apparatus according to a first embodiment, and a configuration of a flow cytometer that includes the sample liquid-sending apparatus.

FIG. 1 primarily illustrates a sample liquid-sending apparatus according to a first embodiment, and a configuration of a flow cytometer 100 that includes this sample liquid-sending apparatus 50. The flow cytometer 100 includes the sample liquid-sending apparatus 50 and an analyzer 41.

The analyzer 41 includes a function to analyze the characteristics of a sample detected in the sample liquid-sending apparatus 50. In other words, the flow cytometer 100 typically serves as a cell analyzer.

The sample liquid-sending apparatus 50 includes a placement portion 30 in which a sample tube (a sample container) 38 is placed, a nozzle 15 that can be inserted into the sample tube 38, and a nozzle arm 26 that serves as a nozzle support that supports and fixes the nozzle 15. A suspension of a sample is contained in the sample tube 38. The sample is typically a biological cell. The placement portion 30 is configured such that a plurality of sample tubes 38 can be placed in the placement portion 30, but the placement portion 30 may be configured such that only one sample tube 38 can be placed in the placement portion 30.

Figure 2:
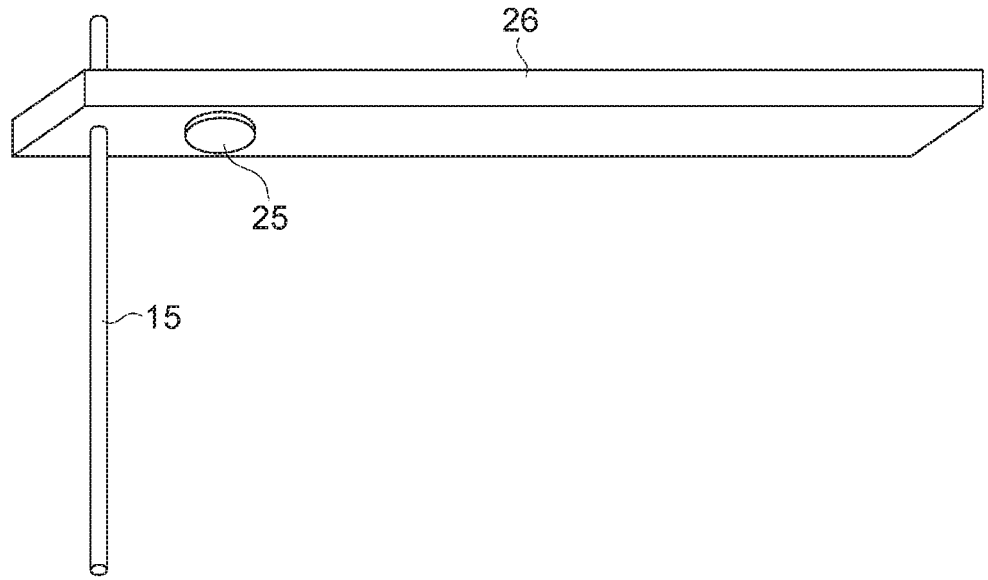
FIG. 2 illustrates a primary portion of the sample liquid-sending apparatus illustrated in FIG. 1.

The sample liquid-sending apparatus 50 includes a vibrator 25 that vibrates the nozzle 15. Also illustrated in FIG. 2, the vibrator 25 is provided to, for example, the nozzle arm 26. Examples of the vibrator 25 include an eccentric motor, a piezoelectric element, a solenoid, and a magnetostrictor.

The sample liquid-sending apparatus 50 includes a sheath tank 10, a waste-liquid tank 19, pumps 11 and 12 that create flow in liquid, and a detector 20 that detects a sample by creating a sheath stream using a sheath liquid from the sheath tank 10. The sample liquid-sending apparatus 50 further includes a sheath stream tube 16 that connects the pump 11 and the detector 20, a sample stream tube 17 that connects the nozzle 15 and the detector 20, and a joining stream tube 18 that connects the detector 20 and the pump 12 (a buffer 13 provided before the pump 12).

The two pumps 11 and 12 are respectively provided upstream and downstream, and, for example, their driving pressures and driving timings are controlled. This results in precisely controlling the flow of liquid in the sheath stream tube 16, the sample stream tube 17, the detector 20, and the joining stream tube 18.

A "suction mechanism" is formed primarily by piping of, for example, the nozzle 15, the pumps 11 and 12, and the sample stream tube 17.

The detector 20 primarily includes a cuvette. The creation of a sheath stream in the cuvette using a sheath liquid enable samples from the sample stream tube 17 to be aligned to flow. A sample detection is performed by a laser being irradiated by a laser generator (not illustrated) onto samples that are aligned to flow in the cuvette. A biological cell is primarily used as the sample.

The detector 20 and the analyzer 41 are connected to each other through, for example, an optical fiber 43. The analyzer 41 includes a function to analyze the optical characteristics of, for example, scattered light and fluorescence generated by laser irradiation. The analyzer 41 includes a computer.

A portion of or the entirety of the sample stream tube 17 is made of a flexible material such as silicon rubber. For example, a three-dimensional drive mechanism (not illustrated) that drives the nozzle arm 26 is connected to the nozzle arm 26. The three-dimensional drive mechanism is capable of moving the nozzle 15 to insert into a plurality of two-dimensionally arranged sample tubes 38.

The sample liquid-sending apparatus 50 includes a controller 45. The controller 45 is configured to control driving of the respective mechanisms such as the vibrator 25, the pumps 11 and 12, and the others. In particular, the controller 45 is configured to control at least one of the strength of a vibration caused by the vibrator 25 or the length of time of the vibration. In addition to these drivers, the controller 45 includes a central processing unit (CPU), a random access memory (RAM), and a read only memory (ROM) in principle. Instead of the CPU, the controller 45 may include a programmable logic device (PLD) such as a field programmable gate array (FPGA). Further, the controller 45 includes a driver (not illustrated) that drives, for example, the vibrator 25 and the pumps 11 and 12.

1.2) Operation of Sample Liquid-Sending Apparatus

Figure 3:
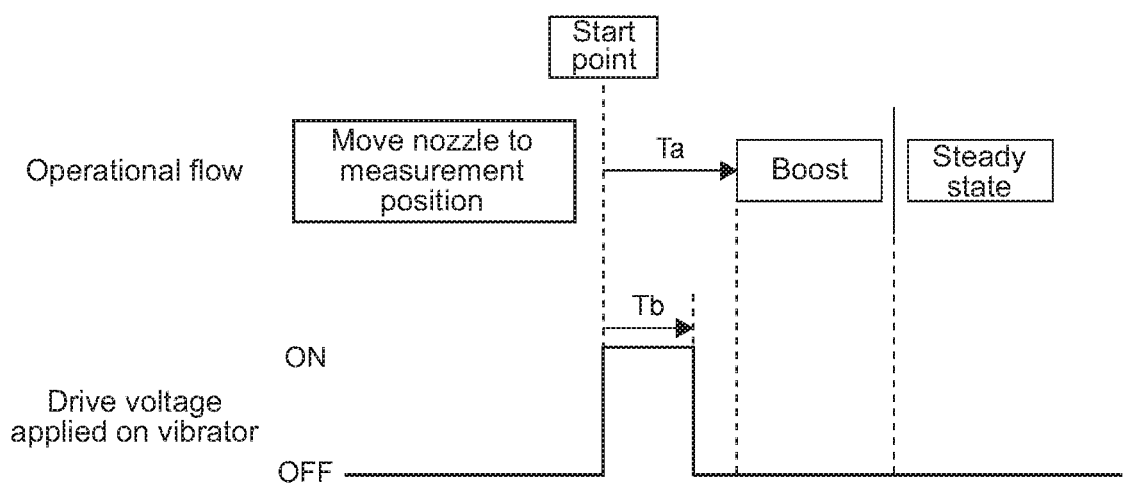
FIG. 3 is a time chart of an operation of the sample liquid-sending apparatus and a voltage applied on a vibrator.

FIG. 3 is a time chart of an operation of the sample liquid-sending apparatus 50 and a voltage applied on the vibrator 25. The sample tube 38 is placed in the placement portion 30, and the nozzle 15 is inserted into the sample tube 38. In other words, the nozzle 15 moves to a measurement position. Then, the controller 45 causes the vibrator 25 to vibrate by applying a drive voltage on the vibrator 25. The drive voltage keeps on being applied for a specified time period (a length of time Ta), with a timing of starting the application of the drive voltage being used as a start point, and the vibration of the nozzle is maintained during the specified time period. Accordingly, a suspension in one sample tube 38 into which the nozzle 15 has been inserted, is stirred.

The strength of a vibration (such as the magnitude of a drive voltage) is set such that the nozzle 15 does not come into contact with the sample tube 38. Further, the controller 45 can also control a drive voltage such that the drive voltage varies in a range in which the nozzle 15 does not come into contact with the sample tube 38.

After the length of time Ta passes from the start point (after the vibrator 25 stops vibrating), the length of time Ta being longer than a length of time Tb from the start point, the controller 45 starts boosting the pumps 11 and 12. The boosting means pulsing a pump for a short time period of, for example, about one second to a few seconds. In other words, a suction operation performed by the nozzle 15 is started by starting the boosting.

The suction pressure of the nozzle 15 upon boosting is, for example, a few kPa. This results in quickly suctioning a suspension in the sample tube 38 through the nozzle 15, and in guiding a large number of samples to the detector 20.

When a boost is performed and then the boost is released, the state in which the boost has been released is referred to as a steady state. In the steady state, the stream of a sample in the nozzle 15 and the sample stream tube 17 is steady. This enables the detector 20 to accurately detect samples one by one, the samples being aligned due to a sheath stream from the sheath stream tube 16. The analyzer 41 analyzes data of the optical characteristics of a sample obtained by the detector 20.

For convenience, a series of processes from a start of a boost to at least a detection of a sample that is performed by the detector 20 is hereinafter referred to as "measurement".

FIG. 4A illustrates the entirety of the sample tube 38 being moved by a stirring method used in the past, the method moving an entire sample container integrally. FIG. 4B illustrates the nozzle 15 being vibrated by the vibrator 25. As described above, the nozzle vibration caused by the vibrator 25 results in efficiently transmitting the nozzle vibration to a suspension in the sample tube since its amplitude is small.

1.3) Verifications

The inventors performed four verifications, Verifications 1 to 4 described below, in order to prove effects provided by the first embodiment. In the verifications, the inventors used a cell analyzer (SA3800) from Sony Corporation for comparison examples. In other words, the vibrator 25 is provided to a nozzle arm of the cell analyzer for the verifications. The cell analyzer used for the verifications includes a stirring unit at a lower portion of a stage provided with a plurality of sample containers (the sample tubes 38, or a well plate not illustrated), the stirring unit moving the entirety of the plurality of sample containers integrally.

1.3.1) Verification 1

Verification 1 is a verification of an effect that a nozzle vibration caused by the vibrator 25 has on EPS (the number of events per second). Needless to say, in Verification 1, the stirring unit of the cell analyzer described above was not used, and the vibrator 25 was used.

Figure 5:
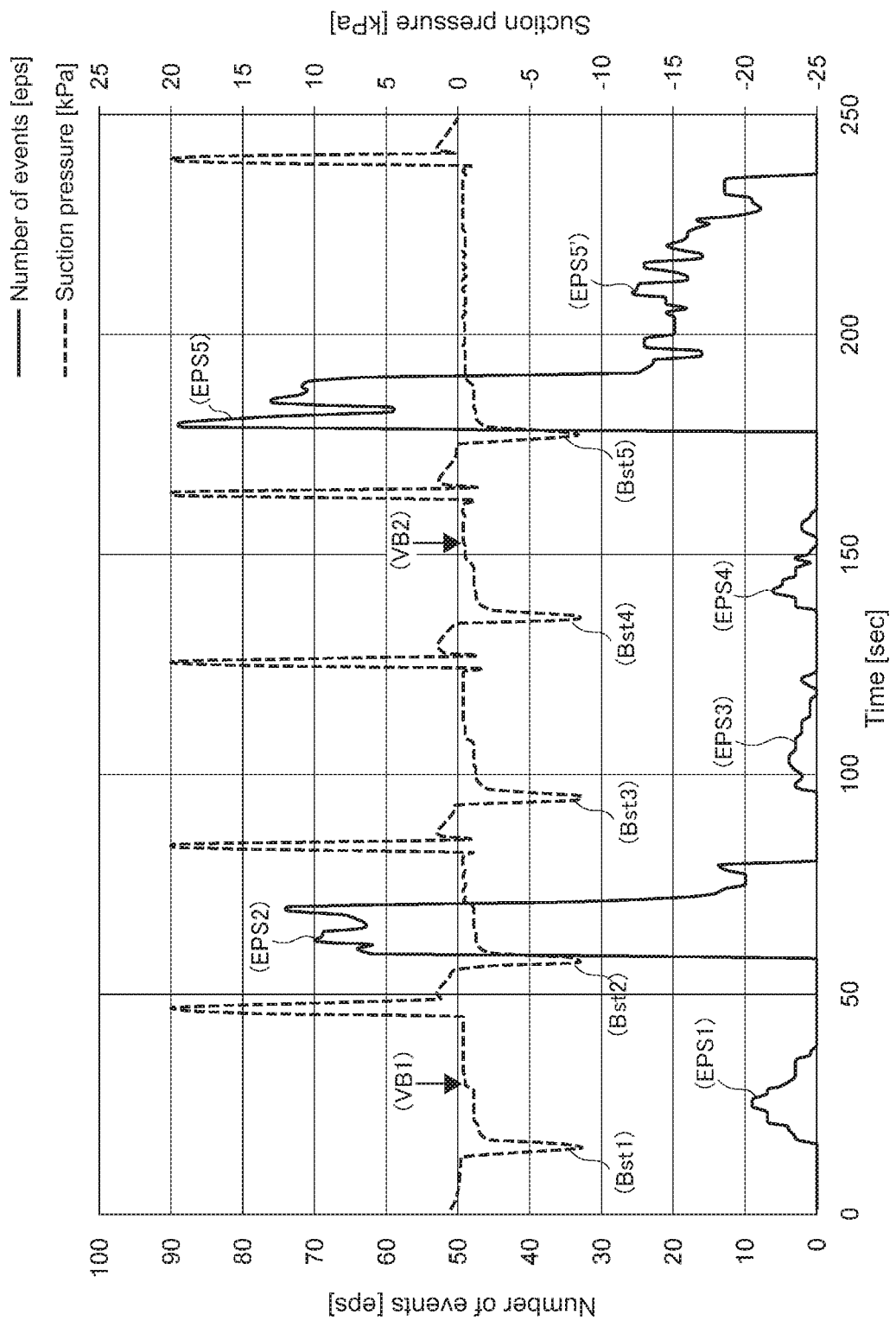
FIG. 5 is a graph illustrating a temporal change in a suction pressure of the nozzle and in the number of events per second (EPS).

FIG. 5 is a graph illustrating a temporal change in a suction pressure of the nozzle 15 (kPa) and in EPS. The event means a detection of one sample performed by the detector 20, and the number of events is the number of samples detected by the detector 20. Referring to the graph of FIG. 5, just after starting measurement, the suction pressure of the nozzle 15 was lower than −5 kPa due to a boost (Bst1), and after the measurement was finished, the suction pressure of the nozzle 15 was close to +20 kPa due to back washing in the sample stream tube 17 and the nozzle 15. The negative value means suction. This change in a value of a suction pressure makes it possible to determine the timings of starting and finishing measurement.

A well plate (96 wells) was charged with samples and liquid for verification. Beads of a dried inorganic material (flow check beads) were used as the samples, and deionized water (DIW) was used as the liquid. Here, the inventors checked the liquid in the well plate, where the liquid in the well plate was not stirred (the vibrator 25 did not vibrate), and it was confirmed that the samples remained pooled in the lower portion of the liquid. In other words, the samples were not dispersed in the liquid. It was confirmed that the EPS was small when the samples were detected in this state (EPS1 in FIG. 5).

When a nozzle vibration was caused by the vibrator 25 for one second (VB1), a large EPS was detected in the process of measurement performed with respect to a next boost, the second boost (Bst2) (EPS2).

Next, the nozzle 15 was moved into a next well in which samples were also pooled in the lower portion of the liquid, and a sample measurement was performed with respect to a boost (Bst3). It was confirmed that the EPS was small (EPS3). Then, a sample measurement was performed again with respect to a boost (Bst4), and it was also confirmed that the EPS was small (EPS4). This proved that, when the nozzle 15 is inserted into a sample container (a well) and measurement is performed, the EPS is not improved in a state in which the vibrator 25 does not vibrate.

After that, when a vibration was further caused by the vibrator 25 for one second (VB2), a large EPS was confirmed in the process of subsequently performed measurement (EPS5 and EPS5').

As a result of the verification described above, clearly different results of the EPS were obtained before and after the nozzle vibration caused by the vibrator 25, which shows the effect of the nozzle vibration.

1.3.2) Verification 2

Figure 6B:
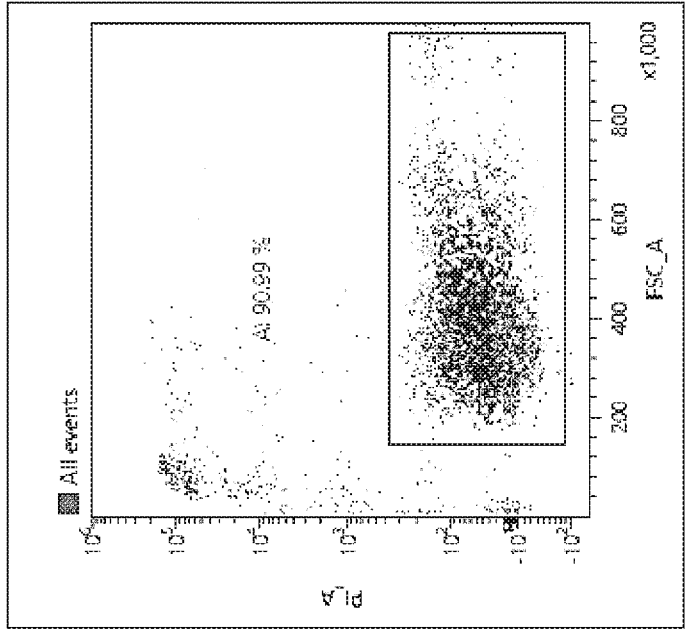
FIG. 6B illustrates a distribution of life and death of the cells after the cells are vibrated for three minutes.
Figure 6A:
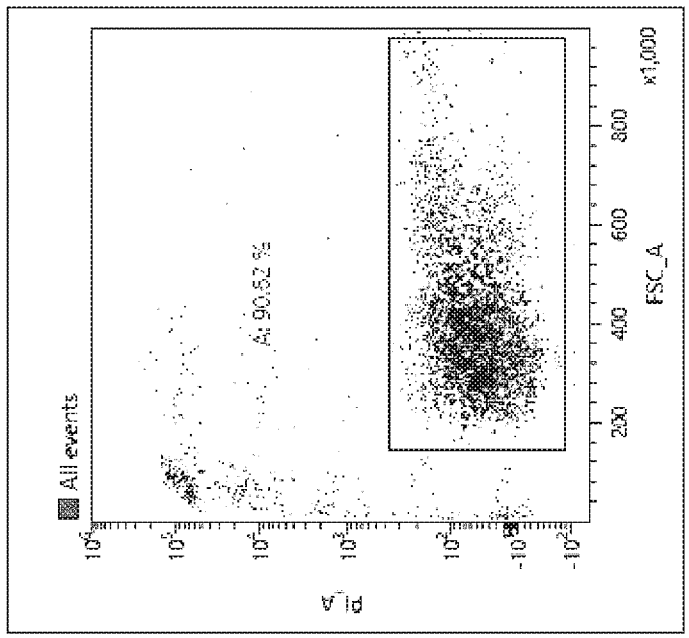
FIG. 6A illustrates a distribution of life and death of cells before the cells are vibrated.

Verification 2 is a verification of an effect that a nozzle vibration caused by the vibrator 25 has on a cell. The inventors verified the effect that a nozzle vibration has on a cell using Jurkat cells. FIG. 6A illustrates a distribution of life and death of cells before a suspension of the cells is vibrated, and FIG. 6B illustrates a distribution of life and death of the cells after the suspension of the cells are vibrated for three minutes. In the graphs, the cells plotted in a boxed range are living cells. As illustrated in the graphs, there is no change in the distribution of life and death of the cells between before and after the vibration. This demonstrates that the three-minute vibration has no effect on the cells.

1.3.3) Verification 3

Figure 7:
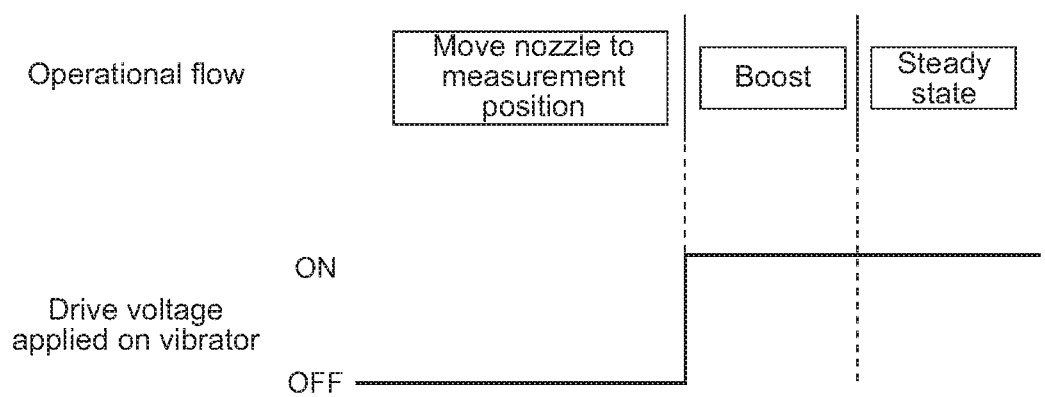
FIG. 7 is a time chart of an applied voltage for causing the vibrator to vibrate continuously upon detecting samples after a boost is finished.

Verification 3 is a verification of an effect in the case of the nozzle 15 being constantly (continuously) vibrated by the vibrator 25 upon detecting samples. The inventors used 40-μm beads as samples, and as illustrated in FIG. 7, also after the second boost (Bst2) is finished, the nozzle 15 was continuously vibrated (VB) upon detecting the samples, and a large number of events were confirmed (EPS1).

Figure 8:
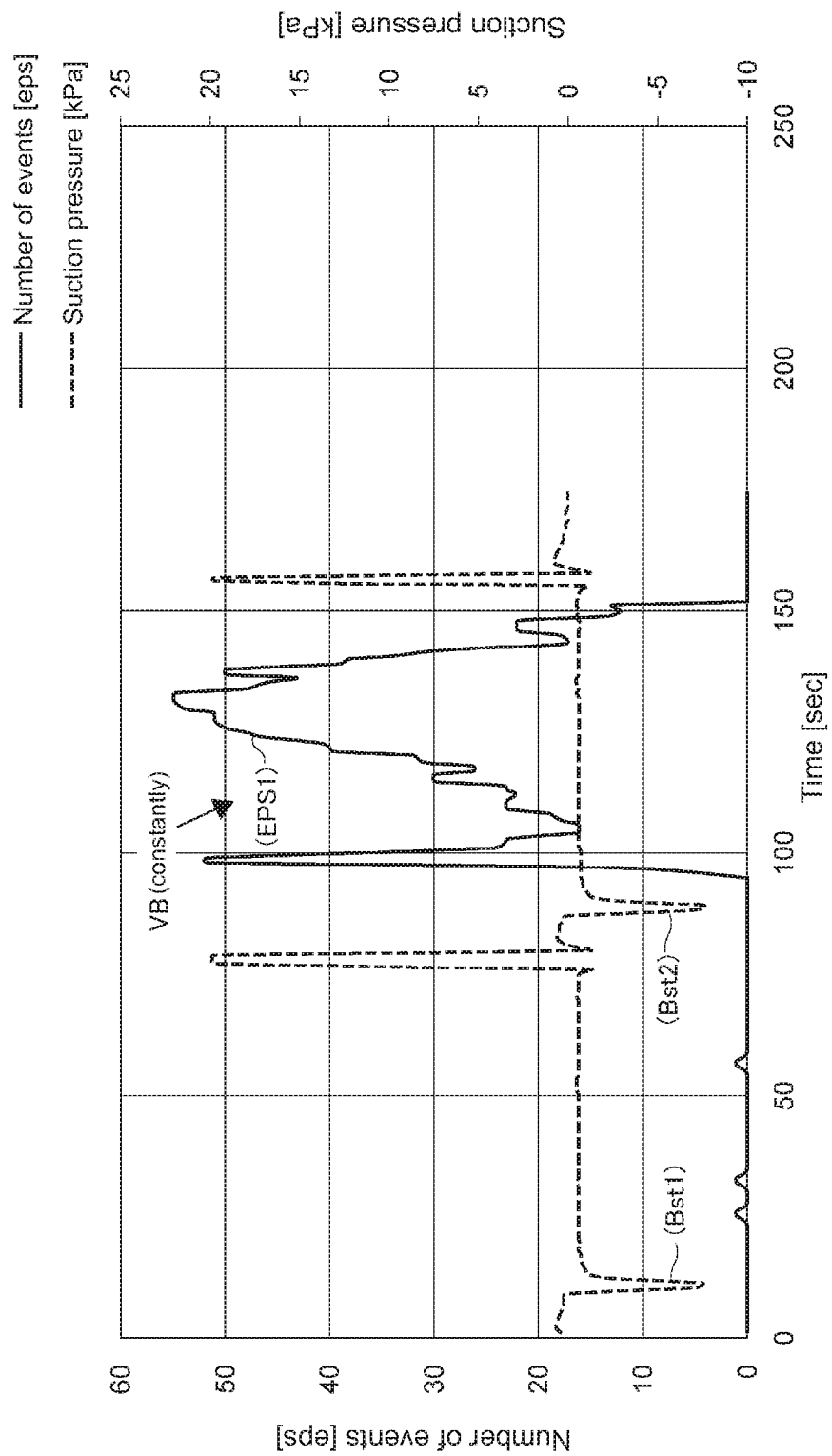
FIG. 8 is a graph illustrating a temporal change in the number of events and in the suction pressure of the nozzle with respect to the time chart of FIG. 7.

FIG. 8 is a graph illustrating a temporal change in the number of the confirmed events and in the suction pressure of the nozzle 15. The 40-μm bead easily sinks in liquid, and thus it is not easy to detect the event. However, as a result of this verification, after the second boost (Bst2) was started, the event was constantly detected when the vibrator 25 was vibrating.

1.3.4) Verification 4

Verification 4 is a verification regarding an amount of suspension containable in a sample container. The inventors performed verification regarding a containable amount of suspension with respect to the case of moving an entire sample container and the case of only stirring a suspension in the sample container using a nozzle vibration. A well plate (96 wells) was used as the sample container. One of the wells in the well plate was fully charged with a sample-containing liquid, and stirring was performed.

When using a stirring method that moves an entire well plate, about 40% of an amount of suspension with which a well is fully charged will spill from the well. Thus, the amount containable in a well is merely about 60%. On the other hand, according to the present technology, no suspension spills from a well fully charged with a suspension when the vibrator 25 vibrates. This indicates that it is possible to increase an amount of suspension containable in a well. Accordingly, it is possible to contain a large number of samples in one well.

1.4) Effects

The first embodiment makes it possible to efficiently stir a suspension in the sample tube 38 since the nozzle 15 is vibrated by the vibrator 25. Compared to a large-scale stirring unit for driving an entire sample tube as disclosed in Patent Literature 1, the first embodiment makes it possible to make a vibration causing source smaller, and this results in being able to make the sample liquid-sending apparatus 50 smaller and to reduce costs.

Further, when using a stirring method that moves an entire sample tube, there is a need for a preliminary operation for performing the stirring, where about 10 seconds are necessary to perform the preliminary operation. On the other hand, the first embodiment has an advantage in there being no need for such a preliminary operation since the vibrator 25 can cause a vibration quickly.

When using a stirring method that moves the entirety of a plurality of sample tubes, the number of stirring performed before measurement starts to be performed, is larger with respect to a sample tube 38 into which the nozzle 15 is inserted later (with respect to a sample tube 38 on which measurement is performed later). Thus, a sample in a sample tube 38 on which measurement is performed later, is mechanically damaged more greatly due to stirring being performed (mechanical damage is accumulated to a greater extent due to stirring being performed). On the other hand, the first embodiment makes it possible to minimize such mechanical damage since only the nozzle 15 inserted into the sample tube 38 is vibrated.

For example, as illustrated in FIG. 8 with respect to Verification 3, it becomes possible to detect an event steadily by causing a nozzle vibration constantly (continuously) after boosting.

For example, as described in Verification 4, it is possible for a sample container (such as a well plate) to contain an amount of sample-containing liquid that is close to the upper limit of an amount of liquid containable in the sample container.

2. Second Embodiment

Next, the sample liquid-sending apparatus according to a second embodiment is described. In the following description, regarding, for example, the members and the functions included in the sample liquid-sending apparatus 50 according to the first embodiment described above, a substantially similar component is denoted by the same reference symbol, a description thereof is simplified or omitted, and the description is made focused on a point of difference.

Figure 9:
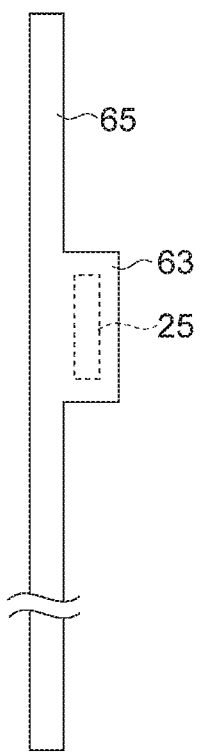
FIG. 9 illustrates a primary portion of the sample liquid-sending apparatus according to a second embodiment.

FIG. 9 illustrates a primary portion of the sample liquid-sending apparatus. A nozzle 65 includes a mounting portion 63 to which the vibrator 25 is provided. For example, the mounting portion 63 is configured such that the vibrator 25 is embedded in the mounting portion 63.

The second embodiment also provides an effect similar to that of the first embodiment described above. In addition, the nozzle 65 is directly vibrated, and this results in improving electrical and mechanical efficiency in vibrational transmission.

3. Third Embodiment

Figure 10:
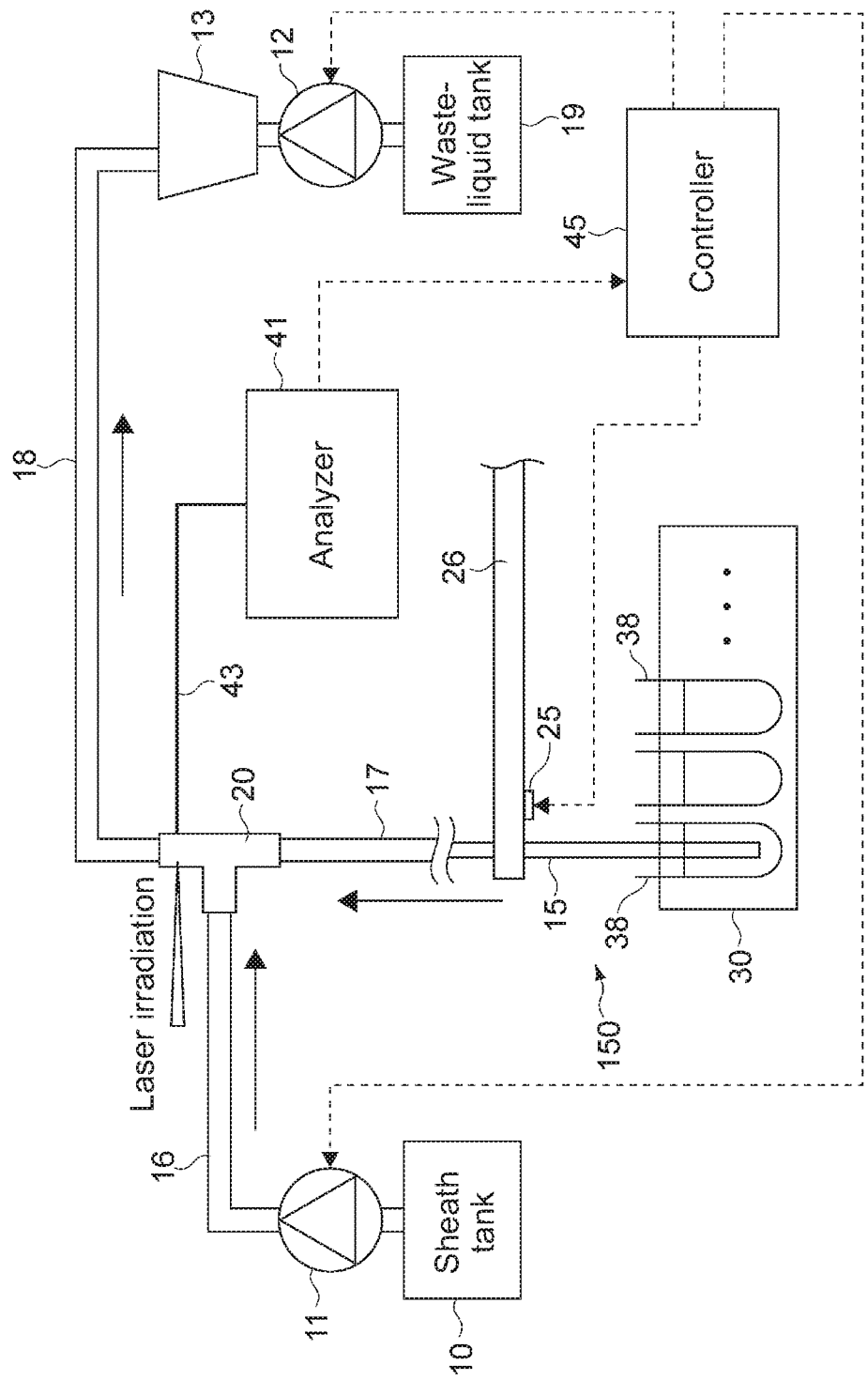
FIG. 10 primarily illustrates a configuration of a sample liquid-sending apparatus according to a third embodiment.

FIG. 10 illustrates a flow cytometer that includes a sample liquid-sending apparatus according to a third embodiment. This sample liquid-sending apparatus 150 is different from the first embodiment described above in that the controller 45 acquires information from the analyzer 41 and performs a feedback control. For example, the analyzer 41 is configured to output, to the controller 45, information regarding a count value of detected samples (the number of samples), that is, information regarding the number of events.

The controller 45 is configured to control at least one of the strength of the vibrator 25 or the length of time of the vibrator 25 according to a threshold set for the input number of events.

Figure 11:
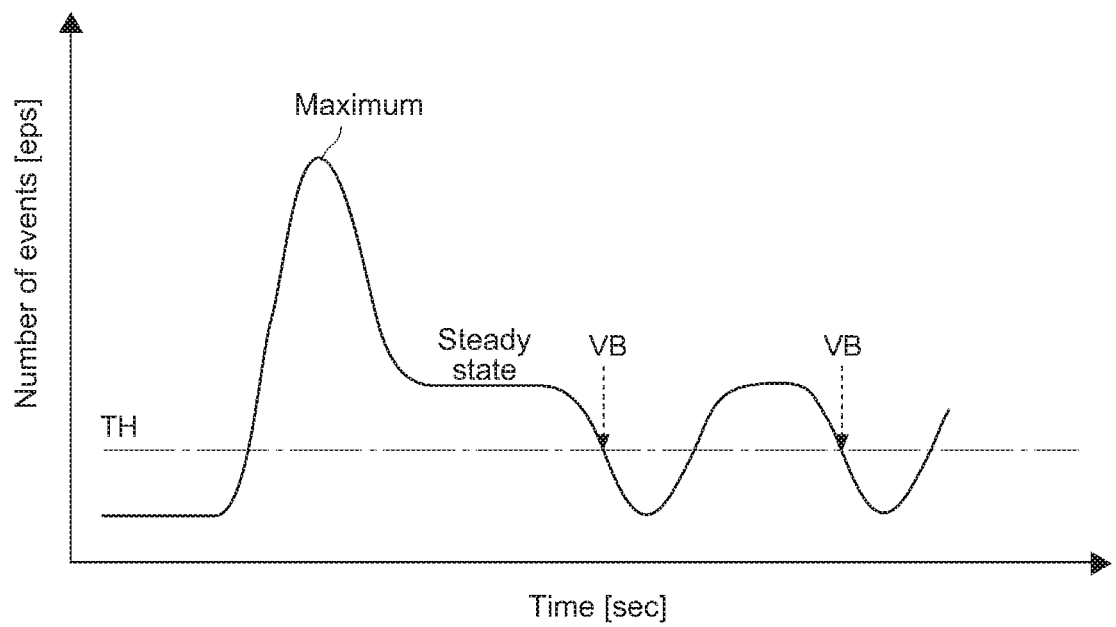
FIG. 11 illustrates a temporal change in the number of events and a timing of starting a vibration in the third embodiment.

FIG. 11 illustrates a temporal change in the number of events. As described above, for example, the controller 45 causes the vibrator 25 to vibrate, stops the vibration, and then starts boosting. Then, the number of events reaches a maximum just after starting the boost. The number of events starts to be decreased and then reaches a steady state. It is assumed that the number of events in the steady state is 100%. For example, a threshold TH can be set in a range of 30% to 80% of the number of events in the steady state.

Specifically, for example, as illustrated in FIG. 5, when the 100% number of events is 25 with respect to the event (EPS5') in a steady state after the fifth boost (Bst5), for example, 15 can be set to be a threshold for the number of events. When the number of events is not greater than the threshold, the controller 45 causes the vibrator 25 to restart vibrating (VB).

Further, when the vibrator 25 is continuously or intermittently driven at a specified drive voltage also after boosting, the controller 45 may increase the drive voltage when the number of events is not greater than a threshold. Furthermore, in the case of intermittent driving of the vibrator 25, the controller 45 may change the intermittent driving to continuous driving when the number of events is not greater than the threshold. Moreover, the change to the continuous driving and the increase in drive voltage may be combined.

Regarding the threshold described above, the number of thresholds is not limited to one, but a plurality of thresholds may be gradually set, and the controller 45 may perform an optical control according to the number of detected events.

The automatic control performed by the controller 45 described above makes it possible to perform a sample measurement efficiently and properly.

Note that, in the description above, information regarding the number of detected samples is fed back to the controller 45 from the analyzer 41. However, for example, when a device that receives information detected by the detector 20 is a device other than the analyzer 41, the information regarding the number of samples may be fed back to the controller 45 from the device other than the analyzer 41.

4. Modification

The present technology is not limited to the embodiments described above. For example, in the embodiments described above, the strength and the timing of the vibration are controlled by the controller 45, but they may be controlled by a manual operation performed by a man.

The sample liquid-sending apparatuses according to the respective embodiments described above each include a single vibrator 25, but they may each include a plurality of vibrators 25 respectively arranged in different positions.

In the first embodiment described above, the controller 45 causes a vibration using the vibrator 25 before boosting, and then stops the vibration. However, as described above, the controller 45 may also cause a vibration continuously or intermittently using the vibrator 25 after boosting, or the controller 45 may cause a vibration continuously or intermittently regardless of the timing of boosting.

The waveform of the drive voltage illustrated in FIG. 3 or 6 is rectangular, but it may be, for example, trapezoidal or triangular, or the wave of the drive voltage may exhibit a ramp form only at one of the rising and the falling.

The sample liquid-sending apparatus according to the present technology can be applied as a sorter.

Figure 12:
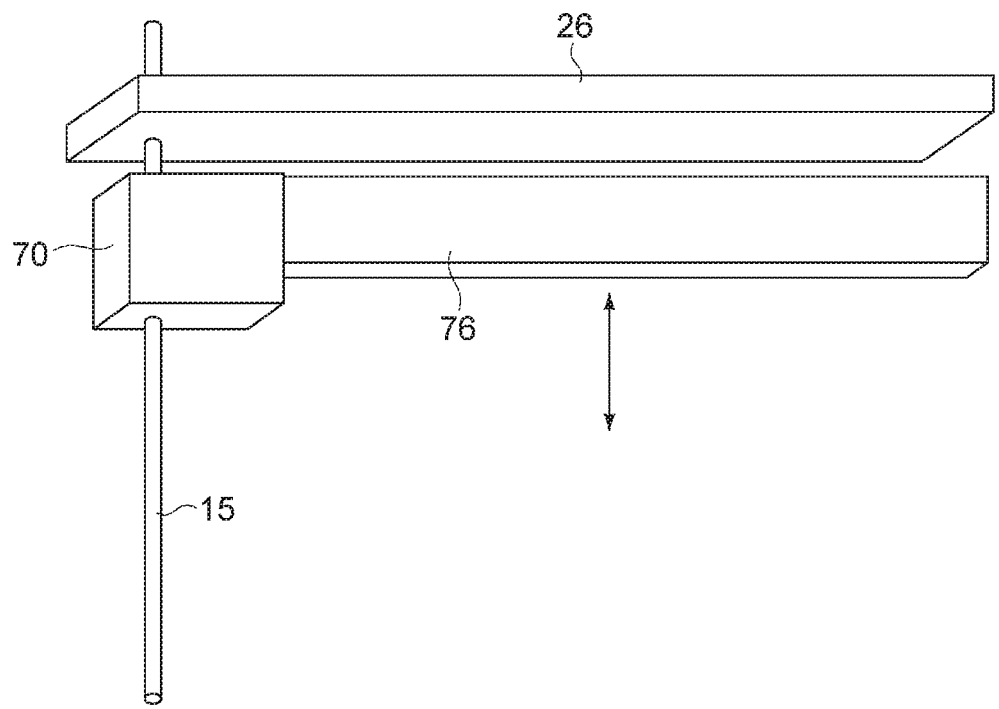
FIG. 12 is a perspective view of a primary portion of the sample liquid-sending apparatus including a cleaning unit.

For example, as illustrated in FIG. 12, the sample liquid-sending apparatus may include a cleaning unit 70 that cleans the nozzle 15. The cleaning unit 70 is connected to an up-and-down mechanism 76, and is configured to be moved by the up-and-down mechanism 76 in parallel with a direction of a length of, for example, the nozzle 15. For example, the cleaning unit 70 moves in a state of being in contact with an outer periphery of the nozzle 15, so as to clean the outer periphery.

Regarding how to clean, for example, the cleaning unit 70 includes a contact member that comes in contact with the outer periphery of the nozzle 15. Cleaning is performed by the contact member being moved up and down by the up-and-down mechanism 76. The contact member is made of, for example, resin. Alternatively, instead of the contact member, the cleaning unit 70 may include a mechanism that supplies a cleaning solution to the outer periphery of the nozzle 15, or the cleaning unit 70 may have a configuration in which the contact member is supplied with the cleaning solution.

Figure 13:
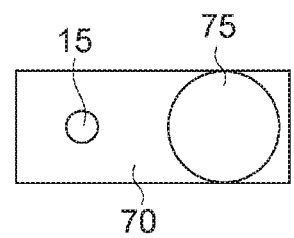
FIG. 13 is a top view of the cleaning unit provided with a vibrator.

FIG. 13 is a top view of the above-described cleaning unit 70 provided with a vibrator. As illustrated in the figure, a vibrator 75 may be provided instead of, or in addition to the vibrator 25 illustrated in FIGS. 1 and 2. The vibrator 75 includes a function similar to that of the vibrator 25, and plays a role similar to that of the vibrator 25. As described above, the position at which a vibrator is provided can be changed as appropriate.

The sample liquid-sending apparatus may be provided with a plurality of vibrators respectively provided at different positions of the sample liquid-sending apparatus. In this case, for example, the nozzle 15 and the nozzle arm 26 may each be provided with the vibrator, or the nozzle arm 26 and the cleaning unit 70 may each be provided with the vibrator.

At least two of the features in the embodiments described above may be combined.

Note that the present technology may also take the following configurations.

(1) A sample liquid-sending apparatus including:
   a placement portion in which a sample container is placed, the sample container containing a suspension of a sample;
   a suction mechanism that includes a nozzle configured to be inserted into the sample container placed in the placement portion, the suction mechanism suctioning the sample through the nozzle; and
   a vibrator that vibrates the nozzle.

(2) The sample liquid-sending apparatus according to (1), further including a nozzle support that supports the nozzle, in which
   the vibrator is provided to the nozzle support.

(3) The sample liquid-sending apparatus according to (1), in which
   the vibrator is provided to the nozzle.

(4) The sample liquid-sending apparatus according to any one of (1) to (3), further including a controller that is configured to control at least one of a strength of a vibration caused by the vibrator or a length of time of the vibration.

(5) The sample liquid-sending apparatus according to (4), in which
   the controller is configured to cause the vibrator to vibrate, and then to cause the suction mechanism to start an operation of suctioning the sample.

(6) The sample liquid-sending apparatus according to (5), in which
   the controller is configured to cause the vibrator to vibrate, to stop the vibrator from vibrating, and then to cause the suction mechanism to start the operation of suctioning the sample.

(7) The sample liquid-sending apparatus according to (4), in which
   the controller causes the vibrator to vibrate continuously or intermittently.

(8) The sample liquid-sending apparatus according to any one of (4) to (7), further including a detector that detects the sample suctioned by the suction mechanism, in which
   the controller is configured to control, according to a threshold, at least one of the strength of the vibration or the length of time of the vibration, the threshold being set with respect to the number of the samples detected by the detector.

(9) The sample liquid-sending apparatus according to (1), further including a cleaning unit that cleans the nozzle.

(10) The sample liquid-sending apparatus according to (9), in which
   the vibrator is provided to the cleaning unit.

(11) The sample liquid-sending apparatus according to (9), further including a nozzle support that supports the nozzle, in which
   a plurality of the vibrators is provided, and
   at least two of the plurality of vibrators are respectively provided to the nozzle support and the cleaning unit.

(12) The sample liquid-sending apparatus according to (2), in which
   a plurality of the vibrators is provided, and
   at least two of the plurality of vibrators are respectively provided to the nozzle and the nozzle support.

(13) A flow cytometer including:
- a placement portion in which a sample container is placed, the sample container containing a suspension of a sample;
- a suction mechanism that includes a nozzle configured to be inserted into the sample container placed in the placement portion, the suction mechanism suctioning the sample through the nozzle;
- a vibrator that vibrates the nozzle;
- a detector that detects the sample suctioned by the suction mechanism; and
- an analyzer that analyzes characteristics of the detected sample.

(14) A sample liquid-sending method including:
- inserting a nozzle into a sample container containing a suspension of a sample, the nozzle being included in a suction mechanism, the sample container being placed in a placement portion;
- vibrating the nozzle; and
- suctioning the sample through the nozzle using the suction mechanism.

REFERENCE SIGNS LIST 15, 65 nozzle
20 detector
25, 75 vibrator
26 nozzle arm
30 placement portion
38 sample tube
41 analyzer
45 controller
50, 150 sample liquid-sending apparatus
63 mounting portion
70 cleaning unit
100 flow cytometer

The invention claimed is:

1. A sample liquid-sending apparatus, comprising:
- a placement portion in which a sample container is placed, wherein the sample container contains a suspension of a sample;
- a suction mechanism moveable relative to the sample container, wherein the suction mechanism includes:
  - a nozzle support;
  - a nozzle configured to be inserted into the sample container placed in the placement portion, wherein the nozzle is held by the nozzle support; and
  - at least one pump connected to the nozzle and configured to suction the sample through the nozzle;
- a vibrator configured to vibrate the nozzle, wherein the vibrator is one of attached to the nozzle support or mounted on the nozzle;
- a detector connected to and between the nozzle and the at least one pump, wherein the detector is configured to detect samples, including the sample, suctioned by the suction mechanism; and
- a controller connected to the suction mechanism, the vibrator, and the detector, wherein the controller is configured to:
  - set a threshold with respect to a number of the samples detected by the detector; and
  - control, according to the threshold, at least one of a strength of the vibration or a length of time of the vibration.

2. The sample liquid-sending apparatus according to claim 1, wherein the nozzle support holding the nozzle is configured for the insertion of the nozzle into the sample container.

3. The sample liquid-sending apparatus according to claim 1, wherein
- the nozzle includes a mounting portion, and
- the vibrator is mounted on the nozzle by the mounting portion.

4. The sample liquid-sending apparatus according to claim 1, wherein the controller is further configured to cause the vibrator to vibrate, and to subsequently cause the suction mechanism to start an operation of suctioning the sample.

5. The sample liquid-sending apparatus according to claim 4, wherein the controller is further configured to cause the vibrator to vibrate, to stop the vibrator from vibrating, and to subsequently cause the suction mechanism to start the operation of suctioning the sample.

6. The sample liquid-sending apparatus according to claim 1, wherein the controller is further configured to cause the vibrator to vibrate one of continuously or intermittently.

7. The sample liquid-sending apparatus according to claim 1, further comprising a cleaning unit connected to and configured to clean the nozzle, wherein the cleaning unit is further configured to move in a state of being in contact with an outer periphery of the nozzle to clean the nozzle.

8. The sample liquid-sending apparatus according to claim 7, wherein the cleaning unit includes the vibrator.

9. The sample liquid-sending apparatus according to claim 7, further comprising a plurality of vibrators including the vibrator,
- wherein the nozzle support and the cleaning unit each include at least one vibrator of the plurality of vibrators.

10. A flow cytometer, comprising:
- a placement portion in which a sample container is placed, wherein the sample container contains a suspension of a sample;
- a suction mechanism moveable relative to the sample container, wherein the suction mechanism includes:
  - a nozzle support;
  - a nozzle configured to be inserted into the sample container placed in the placement portion, wherein the nozzle is held by the nozzle support; and
  - at least one pump connected to the nozzle and configured to suction the sample through the nozzle;
- a vibrator configured to vibrate the nozzle, wherein the vibrator is one of attached to the nozzle support or mounted on the nozzle;
- a detector connected to and between the nozzle and the at least one pump, wherein the detector is configured to detect samples, including the sample, suctioned by the suction mechanism;
- an analyzer connected to the detector and configured to output a count value of a number of the samples detected by the detector; and
- a controller connected to the suction mechanism, the vibrator, and the detector, wherein the controller is configured to:
  - set a threshold with respect to the number of the samples detected by the detector; and
  - control, according to the threshold, at least one of a strength of the vibration or a length of time of the vibration.

11. A sample liquid-sending method, comprising:
- inserting a nozzle into a sample container containing a suspension of a sample, wherein
  - the nozzle is included in a suction mechanism, the nozzle is held by a nozzle support,
the suction mechanism is moveable relative to the sample container, and
the sample container is placed in a placement portion;
vibrating the nozzle by a vibrator, wherein the vibrator is one of attached to the nozzle support or mounted on the nozzle;
suctioning the sample through the nozzle using at least one pump of the suction mechanism;
detecting, by a detector, samples, including the sample, suctioned by the suction mechanism;
setting, by a controller, a threshold with respect to a number of the samples detected by the detector; and
controlling, by the controller, according to the threshold, at least one of a strength of the vibration or a length of time of the vibration.

\* \* \* \* \*